(12) United States Patent
Berglund

(10) Patent No.: US 8,204,611 B2
(45) Date of Patent: Jun. 19, 2012

(54) METHOD FOR REDUCING QUIESCENT POWER DRAW AND MACHINE USING SAME

(75) Inventor: Darrel Berglund, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/845,862

(22) Filed: Jul. 29, 2010

(65) Prior Publication Data

US 2010/0292808 A1 Nov. 18, 2010

Related U.S. Application Data

(63) Continuation-in-part of application No. 11/708,288, filed on Feb. 20, 2007, now abandoned.

(51) Int. Cl.
 G05B 19/18 (2006.01)
 G05B 11/01 (2006.01)
 G06F 1/26 (2006.01)
 G06F 7/00 (2006.01)

(52) U.S. Cl. ............ 700/22; 700/3; 700/9; 700/12; 700/20; 701/36; 701/53; 713/320

(58) Field of Classification Search ............ 700/2, 3, 700/9, 10, 12, 13, 19, 20, 22, 82, 291, 295, 700/296; 701/22, 36, 43, 49, 53, 62, 76, 701/92, 97, 107; 713/300, 310, 320–324
See application file for complete search history.

(56) References Cited

U.S. PATENT DOCUMENTS

| | | | |
|---|---|---|---|
| 4,204,249 A | 5/1980 | Dye et al. | |
| 4,948,986 A * | 8/1990 | Clique | ............ 307/10.1 |
| 5,561,332 A * | 10/1996 | Udo et al. | ............ 307/10.5 |
| 5,714,946 A | 2/1998 | Gottshall et al. | |
| 6,198,995 B1 | 3/2001 | Settles et al. | |
| 6,308,061 B1 | 10/2001 | Criss et al. | |
| 6,411,880 B1 | 6/2002 | McKee et al. | |
| 6,437,460 B1 | 8/2002 | Theofanopoulos et al. | |
| 6,678,593 B2 | 1/2004 | Kachel et al. | |
| 6,838,783 B2 | 1/2005 | Stierle et al. | |
| 6,880,096 B2 | 4/2005 | Sumida | |
| 6,922,622 B2 | 7/2005 | Dulin et al. | |
| 6,944,779 B2 | 9/2005 | Alexander et al. | |
| 7,058,831 B2 | 6/2006 | Cheok et al. | |
| 7,349,769 B2 | 3/2008 | Hayashi et al. | |
| 2003/0159076 A1 | 8/2003 | Delisle et al. | |
| 2004/0078126 A1 | 4/2004 | Huber et al. | |
| 2005/0168072 A1 | 8/2005 | Saito et al. | |

FOREIGN PATENT DOCUMENTS

| | | |
|---|---|---|
| EP | 0 515 042 | 11/1992 |
| JP | 2005088677 | 4/2005 |
| JP | 2008184084 | 8/2008 |
| JP | 2009166549 | 7/2009 |
| WO | 2007140757 | 12/2007 |

* cited by examiner

Primary Examiner — Sean Shechtman
(74) Attorney, Agent, or Firm — Liell & McNeil

(57) ABSTRACT

A machine includes a master electronic control module and at least one secondary electronic control module. A method of operating the machine includes steps of determining whether preconditions are satisfied for changing the master electronic control module from an operating state to a low power state, and determining whether preconditions are satisfied for changing the secondary electronic control module from an operating state to a power off state by opening a power supply circuit. The method also includes steps of changing the secondary electronic control module from the operating state to the power off state, and changing the master electronic control module from the operating state to the low power state.

19 Claims, 7 Drawing Sheets

METHOD FOR REDUCING QUIESCENT POWER DRAW AND MACHINE USING SAME

RELATION TO OTHER PATENT APPLICATION

This is a continuation in part of application Ser. No. 11/708,288, filed Feb. 20, 2007, with the same title.

TECHNICAL FIELD

The present disclosure relates generally to reducing quiescent power draw, and more particularly to a method for reducing quiescent power draw in machines having at least two electronic control modules.

BACKGROUND

An electronic control module is well known in the industry for collecting and processing data relevant, and often critical, to proper machine operation. Such data may include, for example, engine speed, fuel/air mixture, temperature, and various other parameters. The data, after collected and processed, can be used to evaluate the performance of the machine and, more specifically, the engine.

More recently, with the implementation of emission control requirements, electronic control modules are commonly used to facilitate more efficient operation of the engine by affecting control decisions based on the data it has collected and processed. These sophisticated electronic control modules consist of central processing units and assorted inputs and outputs dedicated to controlling various components within the engine subsystem of a machine.

The desire to provide such precise control to various other subsystems of a machine has led to the implementation of multiple electronic control modules. For example, it may be desirable to utilize an electronic control module to control the engine of the machine and another electronic control module to control the drive system of the machine. The central processing unit of each electronic control module may be provided with software that is specific to the tasks carried out by each electronic control module. The multiple electronic control modules may be interconnected via a communications line, such as, for example, a database to utilize information from, or pass information to, the various subsystems. In addition, a electronic control module may be provided to control the functions and interactions of the various other electronic control modules.

Although there is a great benefit to utilizing more than one electronic control module, multiple electronic control modules cause a significant power draw on the machine. When the engine is off and the battery is not being continuously charged, the quiescent power draw from each electronic control module may range in some example known designs from about 10 to 15 milliamps. In machines utilizing multiple electronic control modules, this quiescent power draw becomes significant. If the engine has not been started for a period of time, and therefore the battery recharged, the power draw may deplete the battery and an operator may be unable to start the machine.

U.S. Pat. No. 6,198,995 teaches a monitoring system for a vehicle, wherein the vehicle has been placed in a sleep mode. Specifically, the monitoring system scans the various subsystems at a predetermined time interval for wake-up signals and when no wake-signals are detected the time interval between scans is increased. This results in a decreased power draw from the monitoring system when the vehicle is placed in a sleep mode. This reference does not, however, contemplate decreasing the quiescent power draw from the various subsystems of the vehicle.

The present disclosure is directed to one or more of the problems set forth above.

SUMMARY OF THE INVENTION

In one aspect, a method for operating a machine includes determining whether preconditions are satisfied for changing a master electronic control module from an operating state to a low power state, and whether preconditions are satisfied for changing a secondary electronic control module from an operating state to a power off state. The secondary electronic control module changes from an operating state to a power off state by the master electronic control module removing a power source of the secondary electronic control module. The master electronic control module is changed from an operating state to a low power state. The step of determining whether preconditions are satisfied for changing the master electronic control module from an operating state to a low power state includes checking a status of at least one operating condition of the master electronic control module.

In another aspect, a machine having a ground engaging element includes a drive train system and at least one work implement. A master electronic control module is configured to determine whether preconditions are satisfied for changing the master electronic control module from an operating state to a low power state. The master electronic control module is also configured to determined whether preconditions are satisfied for changing a secondary electronic control module from an operating state to a power off state by the master electronic control module removing a power source of the secondary electronic control module. The master electronic control module is also configured to change the secondary electronic control module from the operating state to the power off state by changing a switch condition of a switch of the master electronic control module. Finally, the master electronic control module is configured to change the master electronic control module from an operating state to a low power state. A power supply circuit electrically connecting a power source to the secondary electronic control module is either an open circuit or a closed circuit responsive to the switch condition of the switch of the master electronic control module.

In still another aspect, a machine includes an electronically controlled engine, an electronically controlled transmission, an electronically controlled implement and an operator control station that are all mounted to a machine body supported by ground engaging elements. A master electronic control module is in communication with a plurality of secondary electronic control modules. The plurality of secondary control modules includes an engine electronic control module, a transmission electronic control module and an implement electronic control module. The master electronic control module includes a first switch, a second switch and a third switch operably coupled to respective power supply circuits for the engine electronic control module, the transmission control module and the implement electronic control module. The master electronic control module is configured to determine whether preconditions are satisfied for changing the master electronic control module from an operating state to a low power state, and configured to determined whether preconditions are satisfied for changing a secondary electronic control module from an operating state to a power off state. The master electronic control module is also configured to change the secondary electronic control module from the operating state to the power off state by the master electronic control module removing a power source of the secondary electronic control module. The master electronic control module is also configured to change the master electronic control module from an operating state to a low powered state.

DETAILED DESCRIPTION

Figure 1:
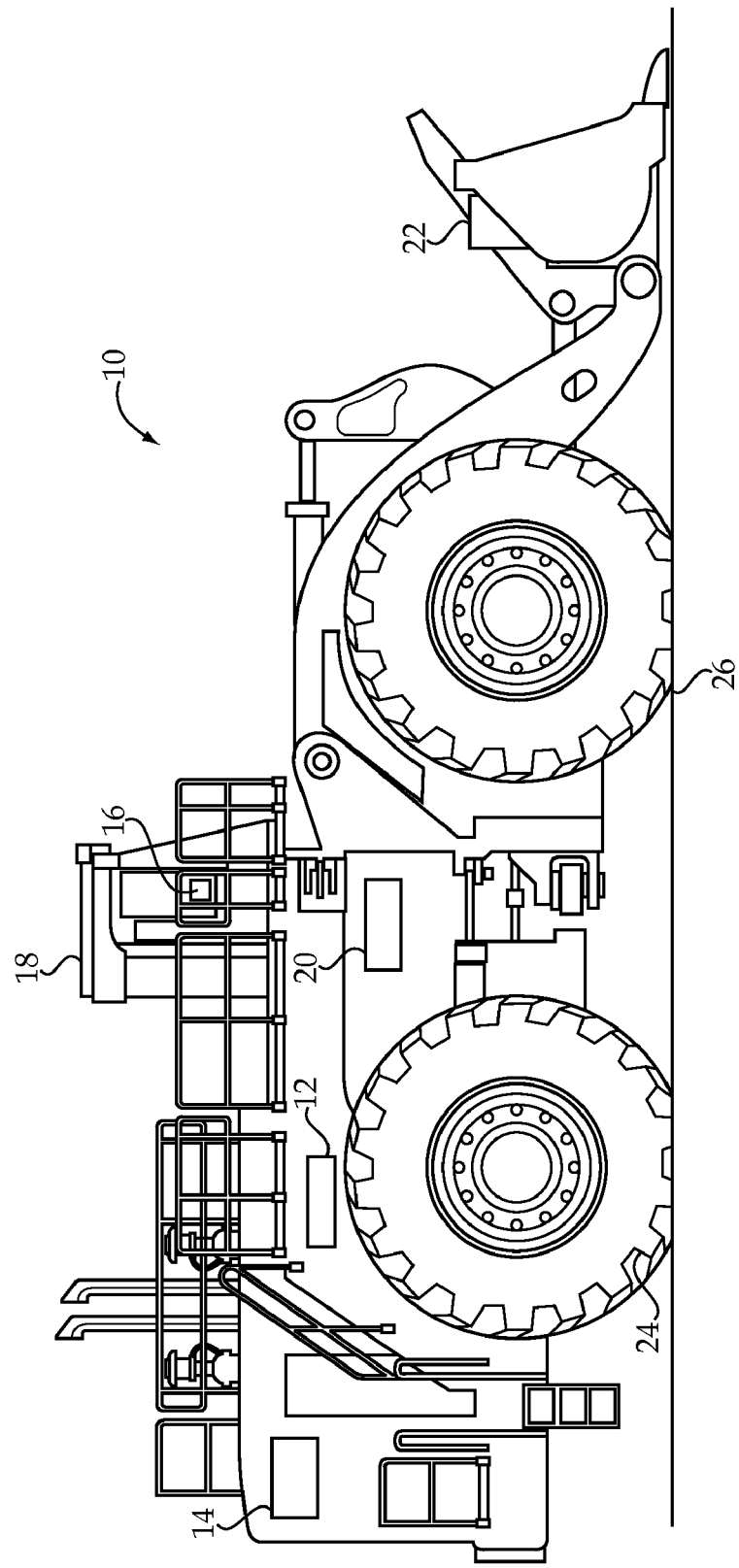
FIG. 1 is a side diagrammatic view of a machine having a control system according to the present disclosure.

An exemplary embodiment of a machine 10 is shown generally in FIG. 1. The machine 10 may be, for example, a wheel loader, or any other vehicle that utilizes a control system including at least two electronic control modules (ECMs). In the illustrated embodiment, wheel loader 10 includes a control system 12 that comprises at least two ECMs. One ECM may, for example, control an engine 14 and an additional ECM may, for example, control an operator interface 16 located within an operator control station 18. An ECM may also be provided for controlling a drivetrain or transmission system 20 of the wheel loader 10 or a work implement of the wheel loader, such as, for example, a bucket 22. In addition, an ECM (master ECM) may be provided for controlling all of the other ECMs utilized by the wheel loader 10. One skilled in the art will appreciate that the control system 12 may include any number of ECMs for controlling any component or subsystem of the wheel loader 10. The wheel loader 10 also includes one or more ground-engaging elements, such as, for example, wheels 24 and 26. Other examples of ground-engaging elements may include tracks, or other propulsion devices and maybe even a stationary generator support. Thus, machine 10 can be thought of as including an electronically controlled engine 14, an electronically controlled transmission 20, an electronically controlled implement 22, and operator control station 18 all mounted on a machine body that is supported by ground engaging wheels 24 and 26.

Each ECM is of standard design and generally includes a processor, such as, for example, a central processing unit, a memory, and an input/output circuit that facilitates communication internal and external to the ECM. The central processing unit controls operation of the ECM by executing operating instructions, such as, for example, programming code stored in memory, wherein operations may be initiated internally or externally to the ECM. A control scheme may be utilized that monitors outputs of systems or devices, such as, for example, sensors, actuators, or control units, via the input/output circuit to control inputs to various other systems or devices.

The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices located internally or externally to the ECM. One skilled in the art will appreciate that any computer-based system utilizing similar components is suitable for use with the present disclosure.

Figure 2:
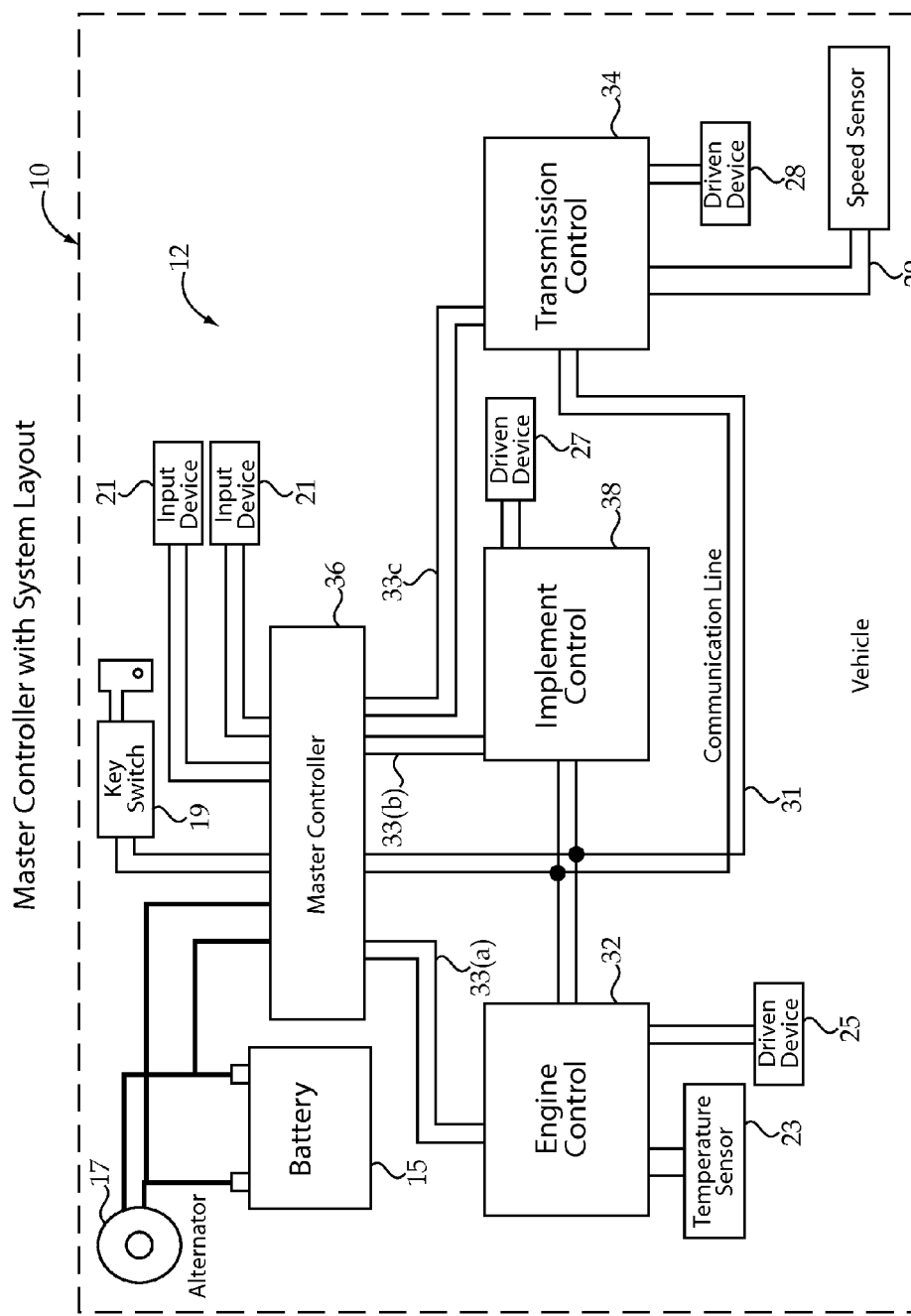
FIG. 2 is a schematic view of one embodiment of the control system for the machine of FIG. 1.

A schematic block diagram of one embodiment of control system 12 is shown generally in FIG. 2. The control system 12 may include an engine ECM 32, a drivetrain system ECM 34, an implement ECM 38 and a master ECM 36. The engine ECM 32 may control various engine components, such as, for example, fuel injectors, and valves, in response to various input signals, such as, for example, engine speed, engine temperature, and various other sensor inputs. The drivetrain or transmission system ECM 34 may control various drivetrain components, such as, for example, a transmission, clutch actuators, driveshafts, differentials and/or hydraulic or electric motors, and drive wheels, in response to various input signals, such as, for example, transmission position, engine speed, and various other sensor inputs. The operator interface ECM 36 may control various operator interface components, such as, for example, any component or subsystem of the wheel loader 10 that may be controlled by an operator from the operator control station 18, in response to various input signals, such as, for example, sensors, actuators, and various other inputs. Each ECM may be in communication with the other ECMs. In addition, one or more of the ECMs may control functions of one or more of the various other ECMs. Alternatively, a separate ECM may be provided for controlling one or more of the other ECMs.

FIG. 2 is also useful for showing the different electrical and communication connections among various devices that are portions of machine 10. Nevertheless, those skilled in the art will appreciate that the components shown in FIG. 2 may represent only a small fraction of electrical devices that are in someway a portion of control system 12. Having said this, machine 10 includes a battery 15 coupled to a charge by an alternator 17 that may be directly driven by the electronically controlled engine 14 (FIG. 1). The master electronic control module 36 has a direct power connection to battery 15 and communicates with an input device such as a key switch 19, and possibly one or more additional input devices 21. Key switch 19 would likely be located in the operator control station 18, whereas input devices 21 may be located elsewhere on machine 10. For instance, input devices 21 may include a door switch which turns on, turns off, or otherwise changes its state in response to door actuation, to alert the master electronic controller to wake up prior to operator actually engaging the key switch 19. Input device 21 may also include a telemetry transceiver for linking to an outside system, such as for receiving software updates for one or more of the electronic controllers for machine 10. Also shown is engine electronic controller 32 that is connected to power source 15 via a power supply circuit 33a that passes through master ECM 36. A variety of sensors may communicate information to engine electronic controller 32, such as a temperature sensor 23 for sensing the temperature of an engine liquid, such as lubricating oil, and/or coolant, etc. In addition, engine electronic controller may communicate with one or more driven devices 25, which may include, for example, fuel injectors. An implement controller 38 receives power by a power supply circuit 33b from power source 15 that also passes through master ECM 36. Implement controller 38 may be in control communication with one or more driven devices 27, such as electro-hydraulic valves that control the hydraulic actuators associated with bucket 22 (FIG. 1). Also shown is a transmission electronic controller 34 that also may receive information from one or more sensors, such as speed sensor 29, and may be in control communication with one or more driven devices 28, such as clutch actuators. The ECM's 32, 34, 36 and 38 are in communication with one another via communication lines 31 in a manner well known in the art.

Figure 3:
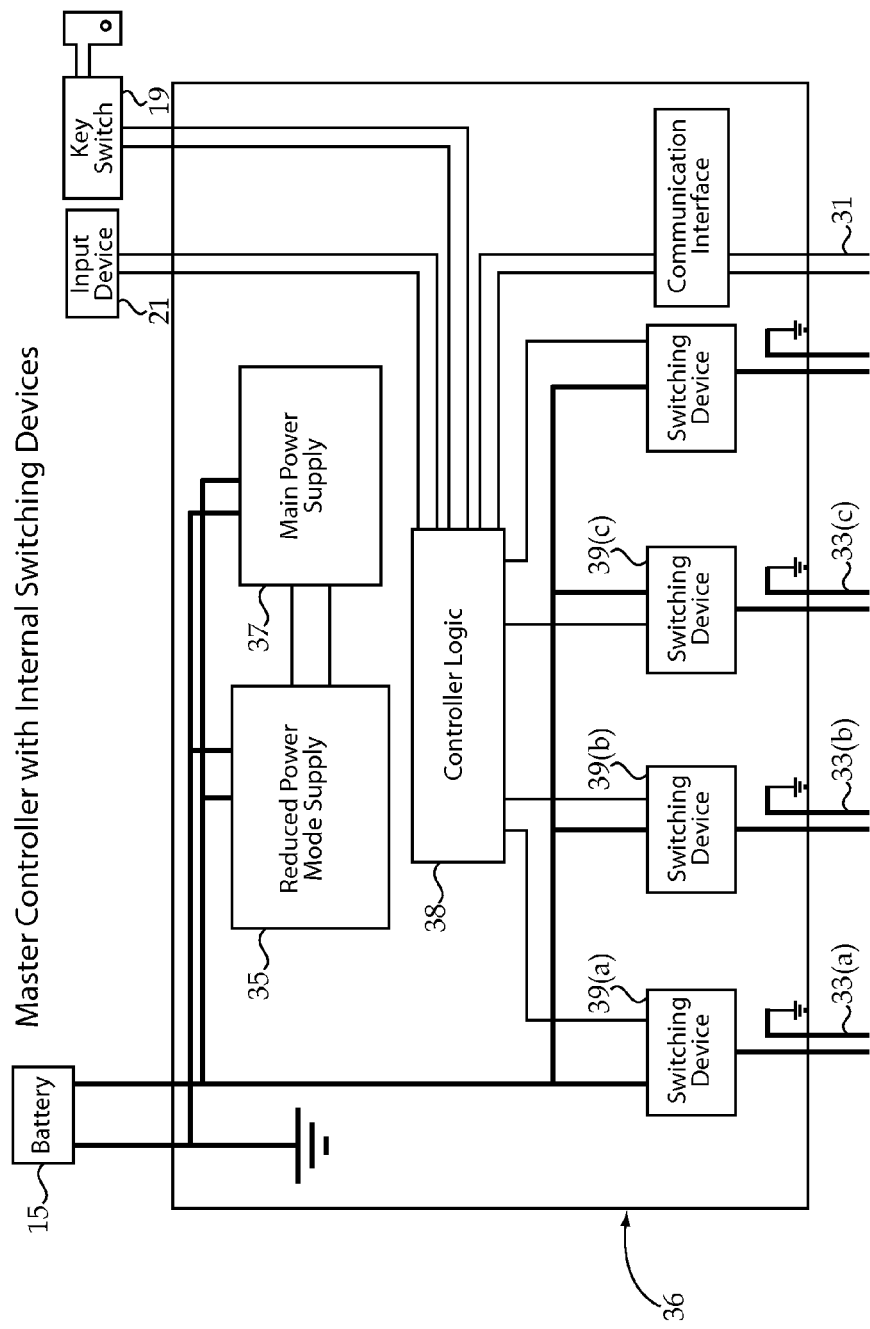
FIG. 3 is a schematic view of one embodiment of a master electronic control module for the control system of FIG. 2.
Figure 4:
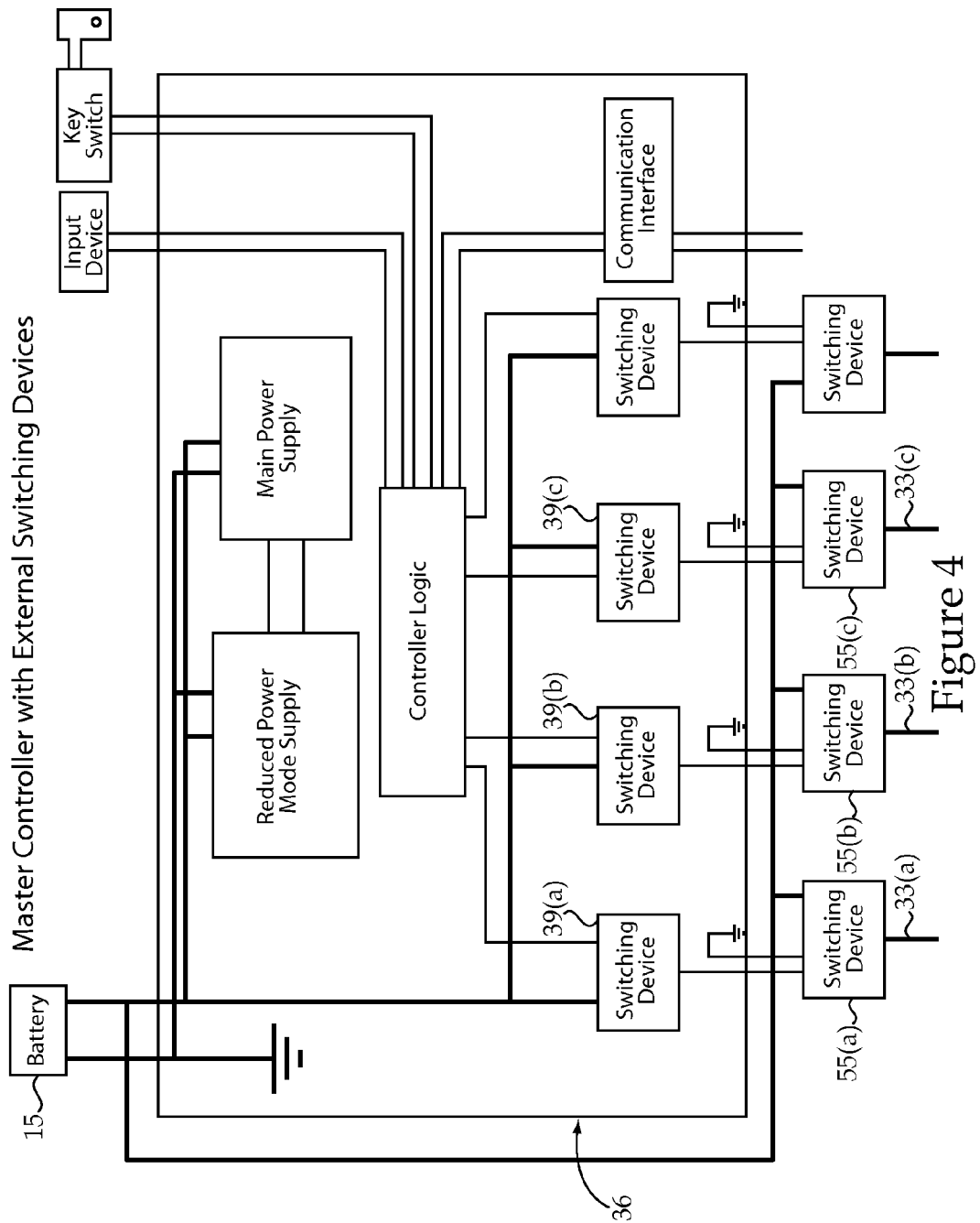
FIG. 4 is schematic view of a master electronic control module and external switching devices according to another embodiment of the present disclosure.

Referring now to FIG. 3, one example master ECM according to the present disclosure includes a reduced power supply module 35 and a main power supply module 37 with direct electrical power supply connections to battery 15. Master electronic control module 36 may also include controller logic 38 that may include a processor, memory, stored software and other features known in the art that are in communication with the other electronic controllers via communication lines 31 and with the key switch 19 and input device(s) 21. Each of the power supply circuits 33a-c of the secondary electronic control modules 32, 34 and 38 includes a respective switch 39a-c that is a portion of master electronic controller 36. Thus, in this embodiment, switches 39a-c have the ability to open the respective power supply circuits 33a-c to completely disconnect the relevant secondary electronic control modules 32, 34 and 38 from the power source 15. FIG. 4 shows an alternative embodiment in which the switches 39a-c are electrically connected to switching devices 55 that are part of the respective power supply circuits 33 of the secondary electronic control modules. Switching devices 55 may include relays or a functional equivalent. Thus, in this alternative embodiment, the switches 39a-c of master ECM 36 are not actually part of the power supply circuits 33a-c for the secondary electronic controllers 32, 34 and 38. However, in both embodiments of FIGS. 3 and 4, the switches 39a-c can be thought of as being operably coupled to control the opening and closure of power supply circuits 32a-c.

Figure 5:
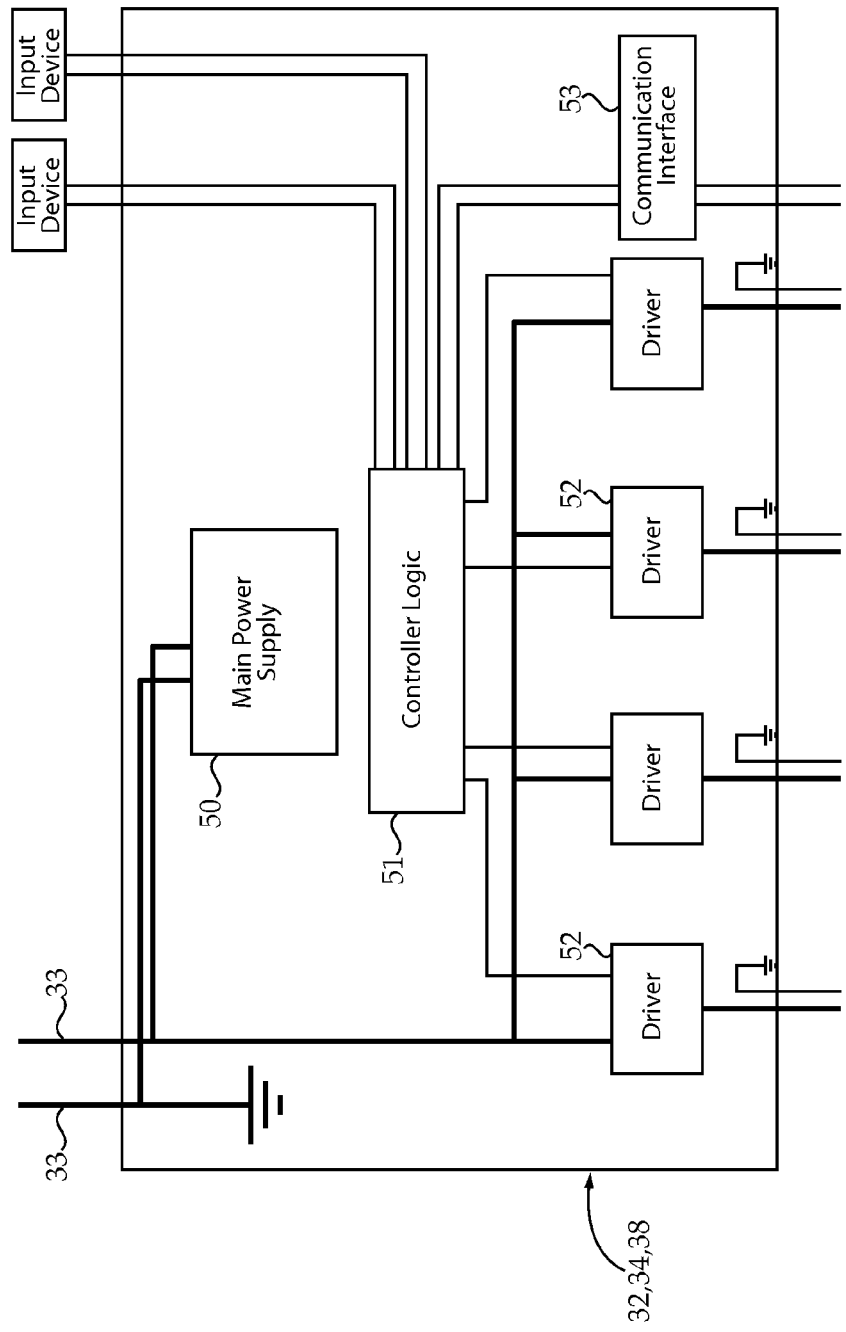
FIG. 5 is a schematic view of a secondary electronic control module according to another aspect of the present disclosure.
Figure 6:
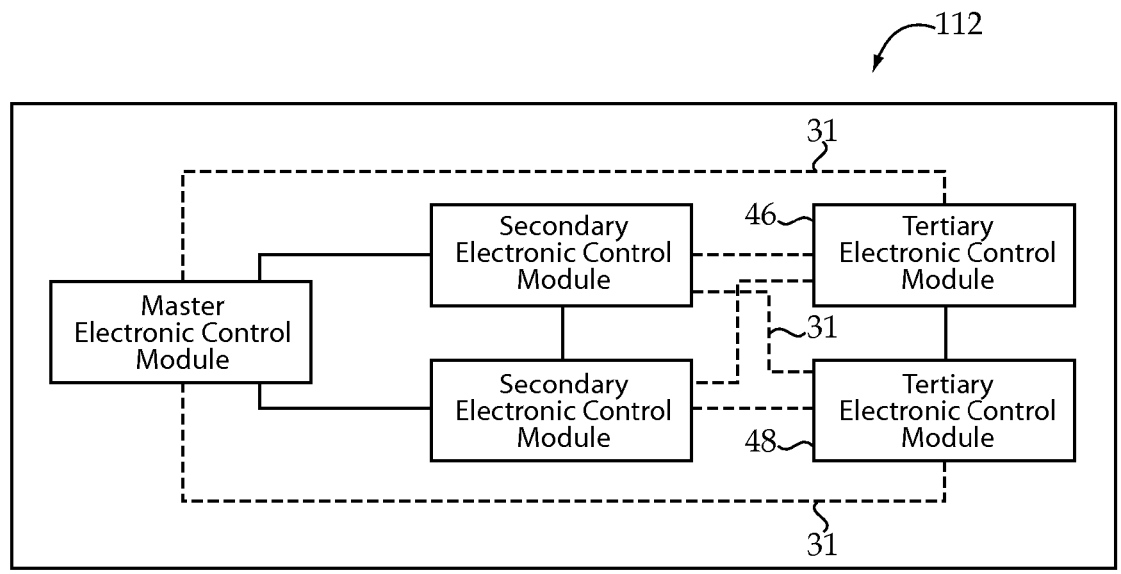
FIG. 6 is a schematic showing an example hierarchy among ECM's for a control system according to the present disclosure.

Referring now to FIG. 5, an example construction for the secondary electronic controllers 32, 34 and 38 is shown with a main power module 50 connected to receive power from the respective power supply circuit 33. Also included is controller logic 51 of a type known in the art that may include a processor, memory and other assorted components to facilitate communication with external input devices and with a communication inner face 53 that facilitates communication with the other electronic control modules. The secondary electronic control modules 32, 34 and 38 may also include a plurality of drivers 52 that control the operation of external driven devices, such as fuel injectors in the case of engine electronic control module 32, electro-hydraulic valves in the case of implement electronic control module 38, and electronically controlled clutch actuators in the case of transmission electronic controller 34. All the features shown in FIG. 5 are well known in the art.

Turning now to FIG. 3 a control system 112 according to an alternative embodiment is illustrated, the ECMs of the control system 112 are shown having software installed thereon designating each ECM as a master ECM, a secondary ECM, or, if utilized, a tertiary ECM. The engine ECM 32 (FIG. 2) may be designated a master ECM 40, while the drivetrain system ECM 34 (FIG. 2) and the implement ECM 38 may be designated secondary ECMs 42 and 44. Thus, in this embodiment master ECM 40 controls the engine and all the other ECMs. This designation may be arbitrary or, alternatively, may be based on a configuration of, or capabilities of, each ECM. In addition, the control system 112 may include one or more ECMs that are designated tertiary ECMs. For example, an additional ECM, such as, for example, an ECM for controlling the bucket 22, may be designated tertiary ECM 46. Thus, a hierarchy may exist with tertiary electronic control modules being subservient to secondary electronic control modules that are subservient to the master electronic control module.

The master ECM 40 may have software stored in memory that implements a method of reducing power draw of a battery by the control system 12. The secondary ECMs 42 and 44 and tertiary ECMs 46 and 48 may also have software installed thereon for implementing the method of reducing power draw. Alternatively, the secondary ECMs 42 and 44 and tertiary ECMs 46 and 48 may not have software installed thereon, and may take instructions from the master ECM 40. The software installed on each ECM is customized to the tasks to be performed by the ECM based on its designation. The software may be provided on each ECM at a time of manufacture or may be installed on each ECM of the control system 12 anytime thereafter.

ECMs may be designated as secondary or tertiary, or any other suitable classification, as desired. A secondary ECM may receive communication directly from the master ECM, whereas a tertiary ECM may receive communication from the master ECM through a secondary ECM. For example, a tertiary ECM may receive communication from the master ECM via a secondary ECM. A hierarchy of designations may be desired, based on specific tasks performed by or on the various ECMs. One skilled in the art will appreciate that any number of designations or classifications may be made regarding the one or more ECMs for numerous reasons.

INDUSTRIAL APPLICABILITY

A typical wheel loader 10 utilizes a control system 12 that includes at least two ECMs. While utilizing multiple ECMs provides precise control over the different subsystems of the wheel loader 10, they also cause a significant power draw on the battery of the machine. When the engine is off and the battery is not being continuously charged, the quiescent power draw from each ECM may range from about 10 to 15 milliamps, but could certainly include a broader or narrower range. In machines utilizing multiple ECMs, this quiescent power draw becomes significant. Each of the ECM's may be in a power on operating state drawing full power when the engine is running and machine is operational, a low power or sleep state when the machine is not operational, and a power off state corresponding to an open power supply circuit(s) and zero power draw. If the engine has not been started for a period of time, and therefore the battery recharged, the power draw may deplete the battery and an operator may be unable to start the machine.

Figure 7:
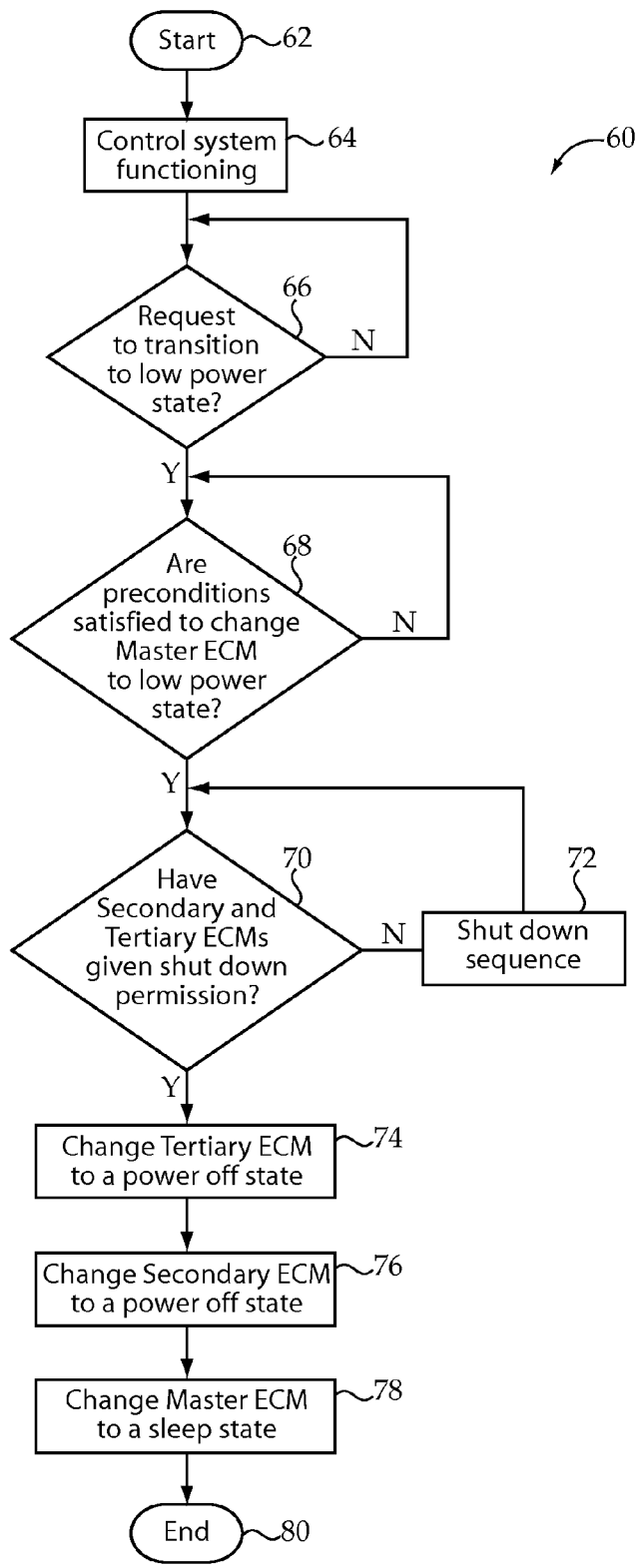
FIG. 7 is a flow chart of one embodiment of a method of reducing quiescent power draw in a machine having at least two electronic control modules according to the present disclosure.

A method of reducing the quiescent power draw of a battery according to FIG. 7 may be implemented to prevent this from occurring. Referring to FIGS. 1-6, flow chart 60 represents an exemplary method of controlling the system 12 (or 112) of wheel loader 10. The method begins at a START, Box 62. From Box 62, the method may proceed to Box 64, which includes normal functioning of the control system 12. At Box 66, the method determines if a request to transition the control system 12 to a low power state has been received. This request may be initiated by switching an ignition key switch 19 of the wheel loader 10 to an off position, or transitioning may be initiated following a predetermined period of time after the ignition key switch 19 of the wheel loader has been switched off. Transitioning might also occur via a control signal generated in response to a predetermined set of conditions. For instance, it may be determined that the engine has been idling for a predetermined period of time, and the request generated in response to engine idle shut down conditions, which are satisfied at least in part by expiration of the predetermined period of time. In one embodiment, the engine idle shut down conditions might include engine idling for about five minutes, or some other period of time prescribed, for example, by law. If a low power state has been requested, the method continues to Box 68. If a low power state has not been requested, the method waits until such a request is made.

At Box 68, the method or, more specifically, the master ECM 36, 40 determines if preconditions have been satisfied to change the master ECM from an operating state to a low power state. These preconditions may include checking a status of at least one operating condition, such as, for example, a software update, of the master ECM 36, 40. It is desirable to ensure such a software update has completed before continuing the method. The preconditions may also include ensuring that a monitored condition of the machine 10 is less than a predetermined threshold. Such monitored conditions may include, for example, parking brake activation, temperatures of machine components, pressures of machine fluids, and gear speeds of the machine transmission. If an ECM is utilized for controlling a hydraulic implement of the machine 10, it may be desirable to make sure the pressure within a hydraulic circuit of the hydraulic implement is below a predetermined level before that ECM is changed to a low power or power off state. If an ECM utilizes an ECM to control a transmission of the machine 10, it may be desirable to make sure gear speeds of the transmission are below a predetermined speed before changing that ECM to a low power or power off state. Similarly, it may be desirable to ensure that monitored speeds and temperatures of or within a component or subsystem that is controlled by an ECM are in a desirable range before continuing with the current method that will transition that ECM to a low power or power off state.

If the preconditions have been met for changing the master ECM 36, 40 to a low power state, the method continues to Box 70. At Box 70 the method or, more specifically the master ECM 36, 40 determines if the secondary ECMs 32, 34 and 38 or (42 and 44 and the tertiary ECMs 46 and 48) have transmitted a shut down permission signal back to the master ECM responsive to a request signal from the master ECM. If the preconditions for changing the master ECM 40 have not been met, the method waits until conditions have been satisfied for changing the master ECM from an operating state to a low power state.

If the master ECM 36, 40 determines, at Box 70, that the secondary ECMs 32, 34 and 38 (42 and 44 and the tertiary ECMs 46 and 48) have given the shut down permission signal to the master ECM, the method proceeds to Box 74. A shut down permission may be given after checking a status of at least one operating condition, such as, for example, a software update, of the secondary and tertiary ECMs. It is desirable to ensure such a software update has completed before continuing the method. A shut down permission signal may also be transmitted after ensuring a monitored condition of the machine 10 is less than a predetermined threshold. Such monitored conditions may include, for example, temperatures, pressures, and gear speeds, and may include the examples described above. If, however, the secondary ECMs 32, 34 and 38 (42 and 44 and the tertiary ECMs 46 and 48) do not give a shut down permission or do not respond, a shut down sequence for the secondary and tertiary ECMs is reinitiated at Box 72.

The shut down sequence at Box 72, is initiated and carried out by the master ECM 36, 40, may include waiting a predetermined period of time after a response has not been received before continuing to Box 74 of the method, or may include requesting a shut down permission signal a predetermined number of times before continuing the method. It may be desirable to log an error in a remote location, or in a memory of the master ECM 36, 40, or in a memory of the ECM that has not responded with the shut down permission.

At Box 74, the tertiary ECMs 46 and 48 are changed from their normal operating states to power off states. This may be done by the master ECM 40 instructing the tertiary ECMs 46 and 48 to change to a power off state or may be accomplished by the master ECM removing a power source of the tertiary ECMs. From Box 74, the method proceeds to Box 76, where the secondary ECMs 32, 34 and 38 (42 and 44) are changed from their normal operating state to power off states. This may be done by the master ECM 40 instructing the secondary ECMs 42 and 44 to change to a power off state or may be accomplished by the master ECM removing a power source of the secondary ECMs. Removing a power source means disconnecting the secondary ECM from its power source by opening the circuit(s) that supply power to the secondary ECM, either directly (FIG. 3) or indirectly (FIG. 4) via changing a condition of switches 39a-c. Alternatively, however, the secondary ECMs 42 and 44 and tertiary ECMs 46 and 48 may shut themselves down. This could be done in response to a request by the master ECM 36, 40, or could be done automatically after a predetermined period of time.

From Box 76, the method proceeds to Box 78, where the master ECM 36, 40 changes from an operating state to a low power or sleep state. After the master ECM 36, 40, the secondary ECMs 32, 34 and 38 (42 and 44, and the tertiary ECMs 46 and 48) have changed to either low power states or power off states, the method proceeds to the END, Box 80.

Additionally, a sequence or method may provided for changing the master ECM 40, the secondary ECMs 42 and 44, and the tertiary ECMs 46 and 48 back to the operating state. A request to transition the control system 12 to an operating state may be received. As an example, this request may be initiated by switching an ignition key switch 19 of the wheel loader 10 to an on position to start the engine. The method may then change the master ECM 40 from the low power state back to the operating state, and change the secondary ECMs 42 and 44 and the tertiary ECMs 46 and 48 from the power off state to the operating state by again changing a condition of switches 39a-c.

Although the method of FIG. 4 was described in the context of a wheel loader 10, it should be appreciated that the method may be utilized by any machine or system that includes two or more control modules that draw power from a common source, or even different sources. In addition, those skilled in the art should appreciate that the master ECM 36, 40 may initiate or conduct the sequences or steps of the method of FIG. 4 or, alternatively, one or more of the secondary ECMs 42 and 44 or tertiary ECMs 46 and 48 may be configured to initiate or conduct one or more of the steps. Although the steps of the method are presented in a specific order, those skilled in the art will appreciate that the steps may be performed in alternative sequences without deviating from the spirit of the present disclosure.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A method of operating a machine having a master electronic control module and at least one secondary electronic control module, comprising:
   determining whether preconditions are satisfied for changing the master electronic control module from an operating state to a low power state;
   determining whether preconditions are satisfied for changing the secondary electronic control module from an operating state to a power off state;
   changing the secondary electronic control module from the operating state to the power off state by the master electronic control module disconnecting the secondary electronic control module from its power source by opening a power circuit that supplies power to the secondary electronic control module;
   changing the master electronic control module from the operating state to the low power state;
   wherein the step of determining whether preconditions are satisfied for changing the master electronic control module from an operating state to a low power state includes checking a status of at least one operating condition of the master electronic control module; and
   wherein the step of disconnecting the secondary electronic control module includes changing a condition of a switch of the master electronic control module that is operably coupled to the power circuit for the secondary electronic control module.

2. The method of claim 1, wherein the step of determining whether preconditions are satisfied for changing the master electronic control module from an operating state to a low power state further includes determining whether a software update of the master electronic control module is complete.

3. The method of claim 1, wherein the step of determining whether preconditions are satisfied for changing the master electronic control module from an operating state to a low power state further includes determining whether a monitored condition of the machine is less than a predetermined threshold.

4. The method of claim 3, wherein the step of determining whether preconditions are satisfied for changing the master electronic control module from an operating state to a low power state further includes at least one of determining whether a temperature of a machine component is below a predetermined threshold, determining whether a pressure of a machine fluid is below a predetermined threshold, and determining whether a gear speed of a machine transmission is below a predetermined threshold.

5. The method of claim 1, wherein the step of determining whether preconditions are satisfied for changing the secondary electronic control module from an operating state to a power off state includes checking a status of at least one operating condition of the secondary electronic control module, and the master electronic control module receiving a shut down permission signal from the secondary electronic control module.

6. The method of claim 5, wherein the step of determining whether preconditions are satisfied for changing the secondary electronic control module from an operating state to a power off state further includes determining whether a software update of the secondary electronic control module is complete.

7. The method of claim 5, wherein the step of determining whether preconditions are satisfied for changing the secondary electronic control module from an operating state to a power off state further includes determining whether a monitored condition of the machine is less than a predetermined threshold.

8. The method of claim 7, wherein the step of determining whether preconditions are satisfied for changing the secondary electronic control module from an operating state to a power off state further includes at least one of determining whether a temperature of a machine component is below a predetermined threshold, determining whether a pressure of a machine fluid is below a predetermined threshold, and determining whether a gear speed of a machine transmission is below a predetermined threshold.

9. The method of claim 1 wherein the step of disconnecting the secondary electronic control module includes changing a condition of a switch of the master electronic control module that is one of: part of the power circuit for the secondary electronic control module or a control switch for a remote switching device of the power circuit for the secondary electronic control module.

10. The method of claim 1, further including:
    requesting a power off permission from the secondary electronic control module responsive to a request signal transmitted from the master electronic control module to the secondary electronic control module; and
    changing the secondary electronic control module from the operating state to the power off state in response to receipt of the power off permission signal from the secondary electronic control module.

11. The method of claim 1, further including:
    receiving a request to transition the machine to a power on state that includes a signal to start an engine of the machine responsive to changing the state of an input device;
    returning the master electronic control module to the operating state from the low power state; and
    returning the secondary electronic control module to the operating state by changing a switch of the master electronic control module to close the power circuit to reconnect the secondary control module to the power source.

12. A machine having a ground-engaging element, comprising:
    a drive train system and at least one work implement;
    a master electronic control module and a secondary electronic control module, wherein the master electronic control module is configured to determine whether preconditions are satisfied for changing the master electronic control module from an operating state to a low power state, configured to determine whether preconditions are satisfied for changing a secondary electronic control module from an operating state to a power off state by the master electronic control module disconnecting the secondary electronic control module from a power source by opening a power supply circuit, configured to change the secondary electronic control module from the operating state to the power off state by changing a switch condition of a switch of the master electronic control module that is operably coupled to the power supply circuit for the secondary electronic control module, and configured to change the master electronic control module from the operating state to the low power state; and
    the power supply circuit electrically connecting a power source to the secondary electronic control module being either an open circuit or a closed circuit responsive to the switch condition of the master electronic control module.

13. The machine of claim 12, wherein the master electronic control module is further configured to request a power off permission signal from the secondary electronic control module, and change the power supply circuit from a closed circuit to an open circuit in response to receipt of the power off permission signal by the master electronic control module from the secondary electronic control module.

14. The machine of claim 12 wherein the switch of the master electronic control module is one of: part of the power supply circuit for the secondary electronic control module or a control switch for a remote switching device of the power supply circuit for the secondary electronic control module.

15. The machine of claim 12, wherein the machine includes a secondary electronic control module for controlling an engine of the machine and a secondary electronic control module for controlling an operator interface of the machine.

16. The machine of claim 12, wherein the master electronic control module is further configured to receive a request to transition the machine to a power on state responsive to a key switch position, return the master electronic control module to the operating state from a low power state, and return the secondary electronic control module to the operating state from the power off state by changing the switch condition to close the power supply circuit.

17. The machine of claim 12, wherein at least one other electronic control module is designated a tertiary electronic control module.

18. The machine of claim 17, wherein at least one of the master electronic control module, the secondary electronic control module, and the tertiary electronic control module is further configured to determine whether preconditions are satisfied for changing the tertiary electronic control module from an operating state to a power off state, and change the tertiary electronic control module from the operating state to the power off state.

19. A machine, comprising:
an electronically controlled engine, an electronically controlled transmission, an electronically controlled implement and an operator control station all mounted to a machine body supported by ground engaging elements;
a master electronic control module in communication with a plurality of secondary electronic control modules;
the plurality of secondary electronic control modules includes an engine electronic control module, a transmission electronic control module and an implement electronic control module;
the master electronic control module includes a first switch, a second switch and a third switch operably coupled to respective power supply circuits for the engine electronic control module, the transmission electronic control module and the implement electronic control module;
wherein the master electronic control module is configured to determine whether preconditions are satisfied for changing the master electronic control module from an operating state to a low power state, configured to determine whether preconditions are satisfied for changing one of the plurality of secondary electronic control modules from an operating state to a power off state, configured to change the one of the plurality of secondary electronic control modules from the operating state to the power off state by the master electronic control module opening the respective power supply circuit of the one of the plurality of secondary electronic control modules by changing a condition of the respective first switch, second switch and third switch of the master electronic control module that is operably coupled to the power supply for the secondary control module, and configured to change the master electronic control module from the operating state to the low power state.

* * * * *